(12) United States Patent
Cai et al.

(10) Patent No.: US 11,389,953 B2
(45) Date of Patent: Jul. 19, 2022

(54) HYDRAULIC DELTA ROBOT CONTROL SYSTEM

(71) Applicant: Caterpillar Inc., Deerfield, IL (US)

(72) Inventors: Zhijun Cai, Dunlap, IL (US); Daniel P. Sergison, East Peoria, IL (US); Daniel J. Martinez, Peoria, IL (US); Corey L. Gorman, Peoria, IL (US); Rustin G. Metzger, Congerville, IL (US); Eric A. Reiners, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 694 days.

(21) Appl. No.: 16/263,626

(22) Filed: Jan. 31, 2019

(65) Prior Publication Data

US 2020/0246967 A1 Aug. 6, 2020

(51) Int. Cl.
| | |
|---|---|
| *G05B 19/04* | (2006.01) |
| *G05B 19/18* | (2006.01) |
| *B25J 9/14* | (2006.01) |
| *B25J 11/00* | (2006.01) |
| *E02F 3/43* | (2006.01) |
| *B25J 9/00* | (2006.01) |
| *E02F 9/20* | (2006.01) |
| *B25J 15/00* | (2006.01) |

(52) U.S. Cl.
CPC ............... *B25J 9/14* (2013.01); *B25J 9/0051* (2013.01); *B25J 11/005* (2013.01); *B25J 15/0028* (2013.01); *E02F 3/437* (2013.01); *E02F 9/2025* (2013.01)

(58) Field of Classification Search
CPC ......... E02F 3/437; E02F 3/963; E02F 9/2025; E02F 9/2228; B25J 11/005; B25J 15/0028; B25J 9/0051; B25J 9/14
See application file for complete search history.

(56) References Cited

U.S. PATENT DOCUMENTS

| | | | | |
|---|---|---|---|---|
| 2013/0297046 A1* | 11/2013 | Hendron | ................ | B33Y 50/00 700/56 |
| 2019/0224846 A1* | 7/2019 | Pivac | .................... | B25J 19/022 |

FOREIGN PATENT DOCUMENTS

| | | |
|---|---|---|
| CN | 104269191 B | 3/2016 |
| CN | 105600424 A | 5/2016 |
| CN | 106217383 A | 12/2016 |
| CN | 206216696 U | 6/2017 |
| EP | 2799190 B1 | 5/2016 |

* cited by examiner

*Primary Examiner* — Harry Y Oh
(74) *Attorney, Agent, or Firm* — Bookoff McAndrews PLLC

(57) ABSTRACT

A construction system includes an excavator having a hydraulically controlled linkage and a hydraulic robot. The hydraulic robot includes a plurality of arms extending from a base, each arm having a hydraulic motor. The hydraulic robot further includes a robot control system directing movement of the plurality of arms and an end effector platform movable by rotation of the arms.

20 Claims, 4 Drawing Sheets

HYDRAULIC DELTA ROBOT CONTROL SYSTEM

TECHNICAL FIELD

The present disclosure relates generally to delta robots. More particularly, the present disclosure relates to a hydraulic control system of such robots.

BACKGROUND

A delta robot, also known as a spider robot or parallel robot, generally includes three arms connected at one end to a stationary base, and at a second end to an end effector. The arms are coupled to the end effector as parallelograms to restrict the movement of the end effector to pure translation—movement in only the X, Y or Z directions. The base of the robot may include three electric motors for moving the arms to position the end effector. Existing delta robots are commonly actuated using electrical motors. The electric motors provide a low payload that is often less than one kilogram. The payload limitations mean that delta robots are used in refined manufacturing settings, where the end effector carries only loads that do not exceed one kilogram. Further, the electrical motors require electrical power connections, cooling components, heavy wiring, protection from physical overload, etc. Such requirements in electrical connections limit delta robots to stationary or manufacturing factory settings.

European Patent No. 2799190B1 (the '190 patent), filed by Perl et al. on Apr. 16, 2014, describes one such delta robot with a drive system for movement of the end effector. The drive system of the '190 includes three actuators for moving the arms of the delta robot. While the '190 patent broadly describes actuators as possibly being electric, pneumatic, or hydraulic drives, the '190 patent does not describe implementation of the hydraulic drive on a delta robot. In particular, the '190 patent does not detail how to operate a delta robot on a mobile industrial machine, or describe detailed control of the hydraulic drive of the delta robot.

The system of the present disclosure may solve one or more of the problems set forth above and/or other problems in the art. The scope of the current disclosure, however, is defined by the attached claims, and not by the ability to solve any specific problem.

SUMMARY

In one aspect, a construction system may include an excavator having a hydraulically controlled linkage and a hydraulic robot. The hydraulic robot may include a plurality of arms extending from a base, each arm having a hydraulic motor. The hydraulic robot may further include a robot control system directing movement of the plurality of arms and an end effector platform movable by rotation of the arms.

In another aspect, a system for controlling a hydraulic robot may include a hydraulically controlled linkage of an excavator coupled to a robot, wherein the robot comprises an end effector platform movable by a robot arm, the robot arm having a hydraulic motor and a controller configured to activate the hydraulic motor by providing a computed amount of pressure to the pressure valve.

In a further aspect, a method of controlling a hydraulic robot may include receiving a desired speed or desired acceleration for an end effector platform of a delta robot, where the end effector platform may be connected to multiple arms of the robot, each arm having a hydraulic motor. The method may also include calculating, for each arm of the robot, arm rotation speed and arm rotation acceleration, based on the desired speed or desired acceleration. The method may further include calculating, for each arm of the robot, calculating a change in pressure to a respective hydraulic motor of the arm to actuate the arm at the calculated arm rotation speed and arm rotation acceleration. The method may then entail activating a respective hydraulic motor of each arm to rotate the arm, wherein the end effector platform is configured to move with the rotation of each arm of the hydraulic robot.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," substantially," "generally," and "approximately" are used to indicate a possible variation of ±10% in the stated value. Although the current disclosure is described with reference to a mobile industrial machine, such as an excavator, this is only exemplary. In general, the current disclosure can be applied to any mobile or stationary machine, such as, for example, any excavator, backhoe, tractor, etc. While the current disclosure references exemplary placements of sensors, such sensors may be placed in other suitable locations consistent with the present disclosure.

Figure 1:
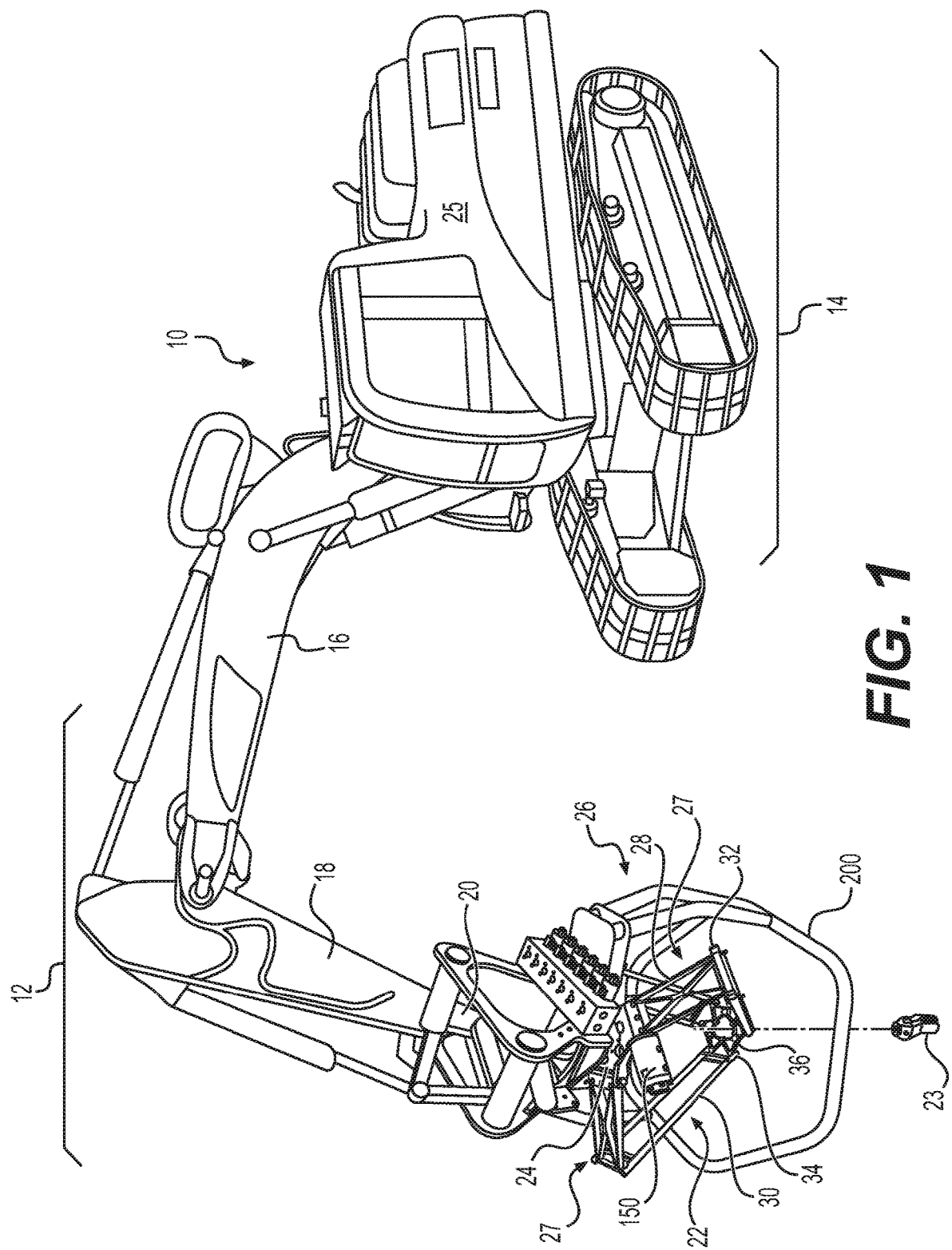
FIG. 1 is an illustration of an exemplary machine with an attached delta robot, according to aspects of this disclosure.

FIG. 1 depicts an exemplary construction system comprising hydraulic excavator machine 10 ("machine"). Machine 10 may include a front portion 12 and a rear portion 14. Front portion 12 may be a hydraulically controlled linkage that includes a boom 16, a stick 18, and a connecting assembly 20 for connecting an end effector assembly 26 including a delta robot 22 and tool or implement 23. Tool or implement 23 may include any end-effectors for construction applications. For example, tool or implement 23 may include a nozzle for additive construction or printing. Alternately or in addition, tool or implement 23 may include clamps, pincers, vacuum tool(s), grippers for moving objects, nail gun, screw gun, torque gun, welder, rebar tying mechanism, brick laying mechanism, etc. Connecting assembly 20 coupling end effector assembly 26 to the stick 18 may include any conventional quick-coupling mechanism, or other connecting system known in the art. Further, delta robot 22 may attach to a construction machine's existing hydraulic system with a quick-couple hose system and minimal controls wiring (not shown).

Delta robot 22 may include a base 24, arm assemblies 27, and an end effector platform 36. The base 24 may couple to connecting assembly 20, and the arm assemblies 27 may be rotationally connected to the base 24. Robot 22 may include three arm assemblies 27 as shown. Each arm assembly 27 may include an upper arm 28 and a lower arm 30. The lower arms 30 may be shaped as parallelograms. A universal joint 32, such as a ball and socket joint, may connect each upper arm 28 and lower arm 30. The upper arm 28, joint 32, and lower arm 30 may be configured to maintain the orientation end effector platform 36 (e.g., minimize tilting). The arm assemblies 27 may join to the end effector platform 36 also using universal joints 34, such as a ball and socket joints. End effector platform 36 may be movable by rotation of the arm assemblies 27. In particular, rotation of each upper arm 28 relative to base 24 may cause movement of the end effector platform 36. Each lower arm 30 may transfer rotation of a respective upper arm 28 to translate the end effector platform 36. The lower arms 30 may maintain the position of the end effector platform 36 such that the end effector platform 36 remains substantively parallel to the base 24 as it moves. End effector platform 36 may be coupled to any tool or implement 23 usable by machine 10.

Rear portion 14 of machine 10 may include an operator cab 25. Operator cab 25 may include a user interface to connect or communicate with a control system 100 (FIG. 2) of robot 22. The elements and layout of machine 10 are merely exemplary. As noted above, the principles of the present disclosure may be applied to any type of machine.

Figure 2:
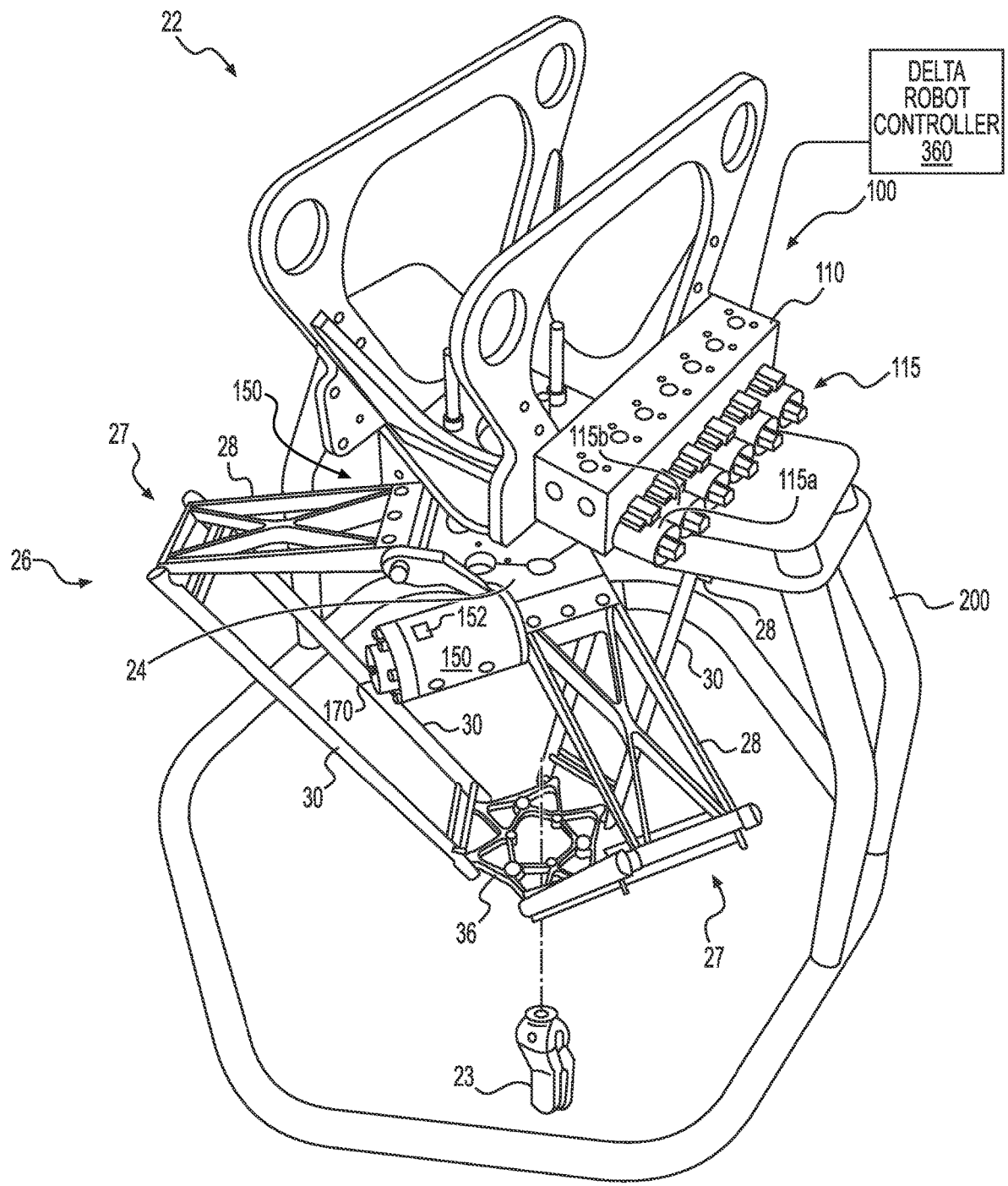
FIG. 2 is an illustration of the exemplary delta robot of FIG. 1.

FIG. 2 depicts the exemplary robot 22 and control assembly 100. Each upper arm 28 may be equipped with a hydraulic actuator (e.g., hydraulic motor 150) and a pressure valve 170). Control assembly 100 may be disposed adjacent to base 24, on a frame 200. Control assembly 100 may include a valve manifold 110 receiving commands from a controller 360 (shown schematically). The valve manifold 110 may be fluidly connected to a pressurized fluid source (not shown) and a drain (not shown). Valve manifold 110 may include a plurality of solenoids 115. Valve manifold 110 may feed and drain one or more of the solenoids 115, based on commands from the controller. In other words, the controller may command movement of robot 22 using valve manifold 110 to actuate hydraulic motors 150 (supply or drain pressurized fluid). The hydraulic motors 150 may include or entail hydraulic actuators. The controller is described in more detail at FIGS. 3, 4A, and 4B. Each solenoid 115 may be associated with a pressure sensor providing control feedback. For example, each solenoid 115 may have a pressure sensor disposed on its surface. The pressure sensor may provide a feedback loop for controller commands.

In one embodiment, valve manifold 110 may include two variable solenoids 115 for each hydraulic motor 150. For example as shown in FIG. 2, robot 22 may use two solenoids 115 (e.g., solenoid 115a and solenoid 115b) to control each hydraulic motor 150. The six solenoids 115 of FIG. 2 may be connected to hydraulic motors 150 (two solenoids per motor). In one embodiment, valve manifold 110 may additionally include spare solenoids.

The hydraulic motor 150 may be comprised of a linear-rotary actuator such that motion of the hydraulic motor 150 may translate into rotary motion of upper arm 28. For example, hydraulic motor 150 may include a shaft (not shown) that extends into a bore (not shown) of upper arm 28 to engage upper arm 28. For instance, the hydraulic motor 150 may include a splined shaft and upper arm 28 may include a cavity receiving the splined shaft. The engagement between hydraulic motor 150 and upper arm 28 may be such that liner motion of the hydraulic motor 150 causes rotational movement of upper arm 28.

In one embodiment, each hydraulic motor 150 may include two ports: an inlet port and an outlet port. A supply hose (not shown) may connect an end of a solenoid 115a to an inlet port of a hydraulic motor 150. A return hose (not shown) may connect an end of a second solenoid 115b to an outlet port of hydraulic motor 150. Each pair of variable solenoids 115 may comprise one supply solenoid and one return solenoid. Solenoid 115a (and a supply hose) may be used in conjunction with solenoid 115b (and a return hose). The supply hose may supply pressurized fluid to hydraulic motor 150 to activate hydraulic motor 150. Pressurized fluid may drain from the return hose. As previously discussed, activation of hydraulic motor 150 may rotate upper arm 28 and cause horizontal or vertical movement of the end effector platform 36.

The hydraulic motor 150 may include a sensor 152 disposed on the motor 150. The sensor 152 may comprise an encoder configured to provide position feedback of the position of upper arm 28. Position feedback of upper arm 28 may include the position of upper arm 28 relative to base 24. In particular, sensor 152 may act as an encoder configured to measure an angle of upper arm 28 relative to base 24.

In one embodiment, each arm assembly 27 may include pressure valve 170. Actuation of hydraulic motor 150 may be initiated by a difference in pressure across pressure valve 170. A difference in pressure across pressure valve 170, may cause the shaft of hydraulic motor 150 to move. The robot 22 may provide fast response to commands from the hydraulic controller, due to the close proximity of the valve to hydraulic actuators (including hydraulic motor 150). This is in sharp contrast to controls located at a hydraulic pump (e.g., positioned at the rear portion 14 of machine 10, or possibly along a boom 16 or stick 18), which require time for the fluid flow to reach the hydraulic actuators and prompt movement. For the pressure-based embodiment, pressure may be maintained across the pressure valve to hold an arm assembly 27 stationary, and incremental pressure may be supplied for the pressure difference to initiate movement of the arm assembly 27. A higher pressure difference may translate into faster motion or rotation of the upper arm 28, while a lower pressure difference may reduce rotational speed of the arm 28. The pressure-based hydraulic activation mechanism provides a fast, responsive way to activate the hydraulic motor 150, thus minimizing delays associated with electrical motor-activated delta robot actuation. The embodiment may also include an accumulator at each pressure valve 170, to further speed up actuation. The accumulator may maintain a supply of fluid so that there is no wait time for a fluid to travel down hydraulic lines from a hydraulic pump situated at the rear portion 14 of machine 10. In other words, the illustrated embodiment of FIGS. 1 and 2 may enhance the responsiveness of robot 22 by positioning the pressure valve 170 adjacent to hydraulic motor 150, maintaining steady pressure levels at end(s) of the pressure valve 170, and accumulator usage. Frame 200 may protect the arm assemblies 27 and end effector platform 36 from contact with the ground when delta robot 22 is detached from machine 10 or at rest.

Figure 3:
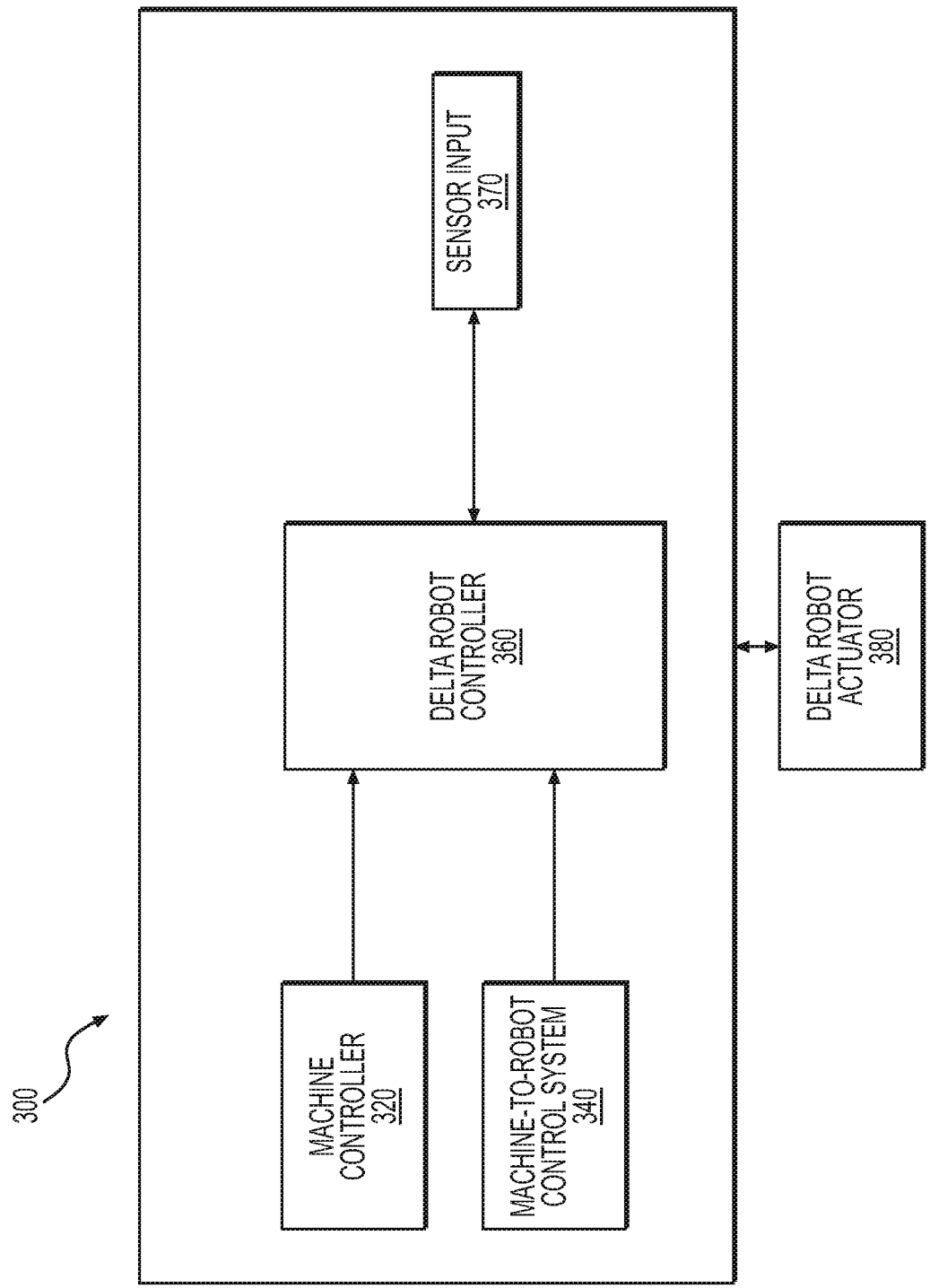
FIG. 3 is a block diagram of an exemplary control system for controlling the exemplary delta robot of FIG. 1.

FIG. 3 depicts an exemplary hydraulic control system 300 for machine 10 and robot 22. Control system 300 may include machine controller 320, machine-to-robot control system 340, delta robot controller 360, and delta robot actuator 380. Machine controller 320 may control machine 10 and machine-to-robot control system 340 may coordinate movement of a component of machine 10 (e.g., stick 18) and robot 22. Delta robot controller 360 may translate desired linear motion into rotational motion to apply to robot 22, and delta robot actuator 380 may apply differential pressure to rotate an arm to move the platform at a desired velocity, along a desired path.

Machine controller 320 and machine-to-robot control system 340 may each embody a single microprocessor or multiple microprocessors that may include systems for monitoring operations of machine 10, issuing instructions to components of machine 10, and/or communicating with external devices. For example, machine controller 320 and/or machine-to-robot control system 340 may include a memory, a secondary storage device, a clock, and a processor, such as a central processing unit or any other means for accomplishing a task consistent with the present disclosure. The memory or secondary storage device may store data and/or software routines that may assist machine controller 320 and/or machine-to-robot control system 340 in performing its functions. Further, the memory or storage device may also store data received from various inputs associated with work machine 10. Numerous commercially available microprocessors can be configured to perform the functions of machine controller 320 and machine-to-robot control system 340. It should be appreciated that machine controller 320 and machine-to-robot control system 340 could readily embody a general machine controller capable of controlling numerous other machine functions. Various other known circuits may be associated with machine controller 320, including signal-conditioning circuitry, communication circuitry, hydraulic or other actuation circuitry, and other appropriate circuitry.

Robot controller 360 may embody a single microprocessor or multiple microprocessors that may include systems for monitoring operations of robot 22, issuing instructions to components of robot 22 (e.g., arm assemblies 27), and/or communicating with external devices (e.g., machine 10). Robot controller 360 may receive a desired end effector path and desired end effector velocity from machine controller 320 and machine-to-robot control system 340. The path and velocity may depend on the size of machine 10, as well as the tool 23 attached to end effector platform 36. The desired path and desired velocity may be received in Cartesian coordinates. Robot controller 360 may convert the received path and velocity to rotational speed. The rotational speed may be the speed of each robot arm assembly 27, which may achieve the path and velocity of the robot end effector platform 36. Robot controller 360 may further compute a pressure difference to rotate arm assemblies 27 at the rotational speed. For example, robot controller 360 may send a current to a pair of solenoids 115 corresponding to a valve and hydraulic motor 150 of an arm assembly 27, and hydraulic motor 150 may cause arm assembly 27 to rotate at a rotational speed based on the pressure difference provided by the solenoids 115. Alternately or in addition, robot controller 360 may compute a pressure difference and corresponding current to convey rotational acceleration to arm assemblies 27.

Robot controller 360 may further operate a feedback loop, in which the rotational speed may be adjusted based on sensor input 370 related to each robot arm assembly 27. Sensor input 370 may include position information comprising data on an angle of each arm assembly 27 relative to a portion of base 24. Position information may be provided by sensor 152 positioned on the motor 150 or each arm assembly 27. Robot controller 360 may receive information from inputs including actual machine component position (e.g., position of stick 18), actual end effector platform position, actual arm position and/or arm angle, desired end effector position, desired end effector platform position, desired end effector path, desired end effector velocity, or a combination thereof. Robot controller 360 may output a pressure difference to provide to each pressure valve of each arm, to move each arm at the desired rotational speed (and/or acceleration) to achieve desired end effector path and velocity. The pressure difference provided to each arm assembly 27 may vary for each arm, depending on the desired movement or position of the end effector platform 36.

Robot controller 360 may further include a memory, a secondary storage device, a clock, and a processor, such as a central processing unit or any other means for accomplishing a task consistent with the present disclosure. The memory or secondary storage device associated with robot controller 360 may store data and/or software routines that may assist robot controller 360 in performing its functions. Further, the memory or storage device associated with robot controller 360 may also store data received from various inputs associated with robot 22. Numerous commercially available microprocessors can be configured to perform the functions of robot controller 360. It should be appreciated that robot controller 360 could readily embody a general machine controller capable of controlling numerous other machine functions. Various other known circuits may be associated with robot controller 360, including signal-conditioning circuitry, communication circuitry, hydraulic or other actuation circuitry, and other appropriate circuitry.

Figure 4A:
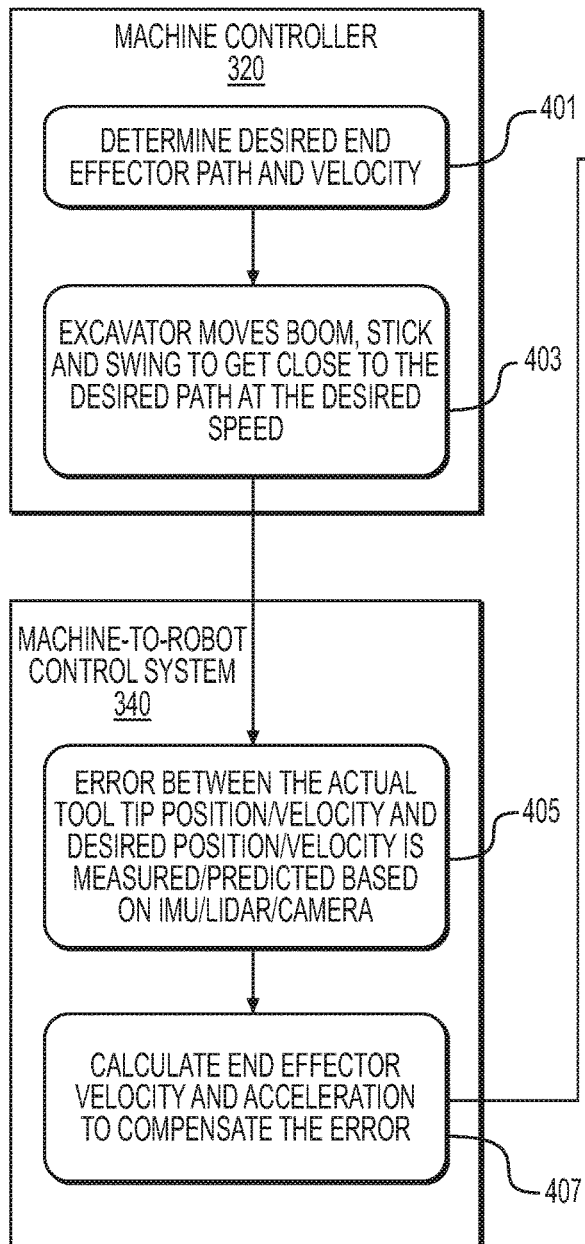
FIGS. 4A and 4B provide flowcharts depicting an exemplary method for controlling the delta robot of FIG. 1.
Figure 4B:
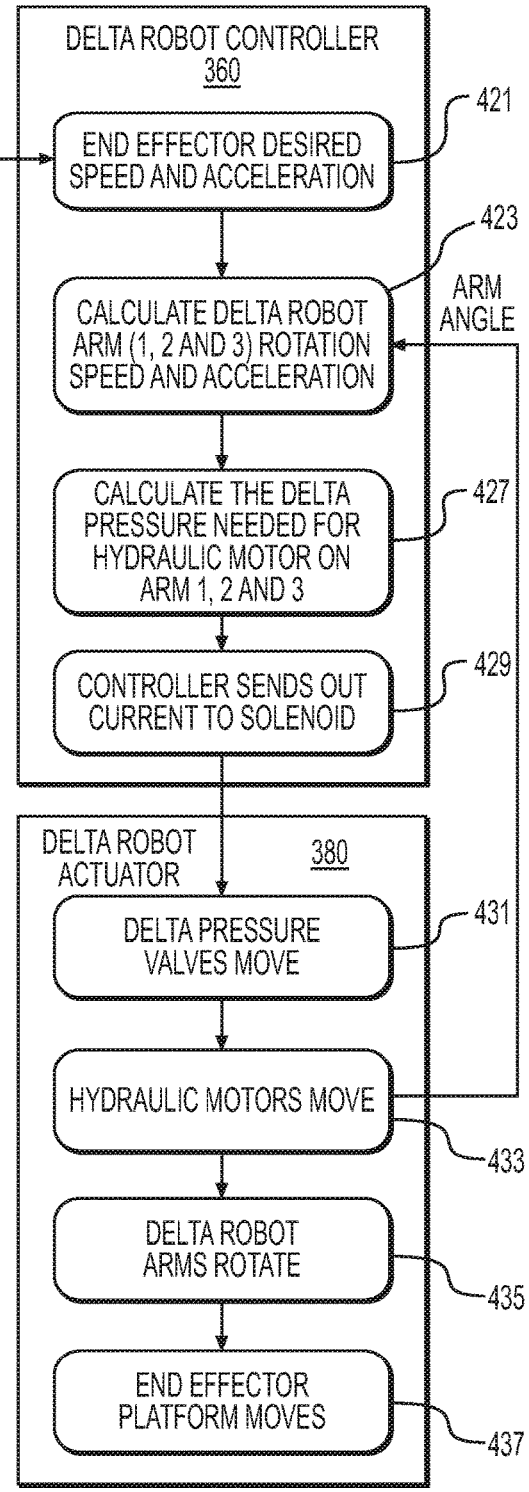

FIGS. 4A and 4B provide further detail on exemplary processes related to the functions and operations of machine controller 320, machine-to-robot control system 340, delta robot controller 360, and delta robot actuator 380.

FIGS. 4A and 4B depict an exemplary methods for operating machine 10 in conjunction with robot 22. In particular, FIG. 4A provides method 400 for determining a desired end effector platform path and a desired velocity for movement of the end effector platform. FIG. 4B provides method 420 for actuating robot 22 to place the end effector on the desired path, at the desired velocity. For example, method 420 includes computing a desired rotational velocity at which to rotate arms of robot 22. Method 420 may further include calculating a pressure difference to provide to each of hydraulic motor 150, to rotate each respective arm at the desired and computed rotational velocity. The steps shown in FIGS. 4A and 4B described below are merely exemplary. One or more of the steps may be omitted and/or one or more steps may be added pursuant to the present disclosure.

Method 400 may be performed by a hydraulic control system of machine 10. The control system of machine 10 may include a machine control system (e.g., machine controller 320) and a machine-to-robot coordinator control system (e.g., machine-to-robot control system 340). While FIG. 4A depicts machine-to-robot control system 340 performing a portion of method 400 and machine-to-robot control system 340 performing another portion of method 400, any step of method 400 may be performed by any control system of machine 10.

In step 401, machine-to-robot control system 340 may determine a desired end effector path and desired end effector velocity. The desired velocity may include a velocity requisite to move machine components at front portion 12 to follow a desired path. The desired path and/or the desired velocity may be provided by a human operator, a sensor mechanism, an automated path and velocity calculation module, or a combination thereof. The machine components may include boom 16 and stick 18, or any movable components of machine 10 (e.g., a swing). Step 403 may include prompting machine 10 move the machine components to follow the desired path, at the desired speed.

Machine-to-robot control system 340 may calculate end effector acceleration for the end effector to reach the desired path at the desired velocity. For example, step 405 may include machine-to-robot control system 340 determining a difference (e.g., an error) between the actual tool tip position against the desired position, or the difference between actual tool tip velocity versus desired velocity. The actual tool tip position and/or the actual tool tip velocity may be provided by one or more sensors, IMU, LIDAR, a camera, or a combination thereof. Alternately, the difference between the actual tool tip position and the desired tool tip position (and/or between the actual tool tip velocity and the desired tool tip velocity) may be determined by sensor(s), inertial measurement unit(s) (IMU), LIDAR, camera(s), or a combination thereof. Step 407 may include calculating end effector velocity and acceleration to compensate for the difference or the error.

As shown in FIG. 4B, method 420 describes a process of actuating robot 22. In one embodiment, steps 421-429 may be performed by robot controller 360. Steps 421-437 may detail mechanisms that take place as a results of steps 421-429. Step 421 may include receiving a desired speed and a desired acceleration for an tool or implement 23 fastened to an end effector. The tool or implement 23 may include any end-effector(s) for construction applications that may be coupled to the end effector platform of root 22. For example, the tool or implement 23 may include an additive construction nozzle (coupled to the end effector platform of robot 22), clamps, pincers, vacuum tool(s), grippers, nail gun, screw gun, torque gun, welder, rebar tying mechanism, brick laying mechanism, or a combination thereof. The desired speed and the desired acceleration may be received from the machine controller 320 and/or the machine-to-robot control system 340. Step 423 may include calculating rotation speed and rotation acceleration for each arm assembly 27 of robot 22, to achieve the desired end effector speed and desired end effector acceleration. The calculation of step 423 may account for position (e.g., arm angle) information received from sensor(s) positioned on each arm assembly 27. Step 427 may include computing, for each arm assembly 27, a change in pressure (e.g., delta pressure) from the motor 150 on the arm assembly 27, based on the calculated rotation speed and calculated rotation acceleration for the arm assembly 27. The calculations of step 423 and 427 take into account the interaction of the plurality of arms of robot 22, and the movement of each arm to translate the end effector platform 36 horizontally or vertically with no tilting or rotation of the end effector platform 26.

Step 429 may include sending a current to each pair of solenoids 115 corresponding to each motor 150, based on the delta pressure computed for the motor 150. The current causes a difference in pressure that may actuate robot 22. For example, the pressure difference may cause the pressure valve 170 of each arm assembly 27 to move (step 431), which may prompt each corresponding hydraulic motor 150 to activate (step 433). Movement of each hydraulic motor 150 may rotate the robot arm assembly 27 engaging each motor 150 (step 435). Rotation of the assemblies 27 may move end effector platform 36 (step 437). Movement of the end effector platform 36 may move the end effector at the desired path and desired velocity provided by machine controller 320. Machine-to-robot control system 340 may monitor the movement of the end effector and adjust commands to the robot controller 360 to reduce discrepancies between desired and actual path/velocity of the end effector.

The disclosed systems and methods are merely exemplary. The methods and structures may be altered to accommodate different operations or qualities of machine 10 and robot 22.

INDUSTRIAL APPLICABILITY

Existing delta robots are often actuated with electrical motors which limit the payload and setting in which delta robots are used. The disclosed aspects of a delta robot controlled by a hydraulic motor may provide for delta robots with, among other things: (1) a high payload capability, (2) the ability to leverage existing hydraulic systems in construction machines and vehicles, and/or (3) highly responsive movement. The high payload capacity provided by a hydraulic motor may allow the delta robot to move tools or implements that an electrically driven delta robot may not be able to carry. In particular, the hydraulic motor may provide the disclosed delta robot with the ability to carry and move heavy tools or implements, such as implements what well exceed a weight of 1 kg. Such added capacity allows the fine-tuned movement and agility of delta robots to be applied to construction systems and settings. Furthermore, the disclosed hydraulic motor may directly be connected to or integrated with the existing hydraulic actuation system of a mobile vehicle, e.g., an excavator. No separate power line, cooling mechanism, physical overload protection, or conversion of engine power, is needed. The disclosed delta robot 22 may simply attach to a construction machine's existing hydraulic system with a quick-couple hose system and light controls wiring. Lastly, the use of pressure valves with hydraulic motors may provide for responsive movement desired in such robot systems.

In addition, while hydraulic drives are broadly known, a desire exists for details in operating a delta robot using a hydraulic system. Because existing delta robots are electrically driven, delta robot control systems are commonly activated by electrical current, rather than pressure or fluid. The disclosed aspects of control system 300 provides an embodiment of an implementation of controlling and actuating a hydraulic delta robot. First, the current disclosure provides exemplary detail of interactions between a (construction) machine controller, a machine-to-robot control system, a delta robot controller, and a delta robot actuator. Next, aspects of the disclosed control system 300 detail the computation of pressure or fluid needs to enact the desired motion of the delta robot.

It will be apparent to those skilled in the art that various modifications and variations can be made to the disclosed system without departing from the scope of the disclosure. Other embodiments of the system will be apparent to those skilled in the art from consideration of the specification and practice of the machine disclosed herein. It is intended that the specification and examples be considered as exemplary only, with a true scope of the disclosure being indicated by the following claims and their equivalents.

What is claimed is:
1. A construction system, comprising
an excavator having a hydraulically controlled linkage; and
a hydraulic robot comprising:

a plurality of arms extending from a base, each arm having a hydraulic motor including a linear-rotary actuator;
a robot control system directing movement of the plurality of arms; and
an end effector platform movable by rotation of the arms.

2. The construction system of claim 1, wherein each hydraulic motor is connected to a single valve manifold.

3. The construction system of claim 2, wherein each of the hydraulic motors includes an encoder configured to provide position feedback.

4. The construction system of claim 2, wherein each of the hydraulic motors includes an encoder configured to measure an angle of an arm relative to the base.

5. The construction system of claim 1, wherein the robot control system comprises a valve manifold with a plurality of variable solenoids.

6. The construction system of claim 5, wherein the valve manifold is positioned on the base.

7. The construction system of claim 6, wherein the plurality of variable solenoids are comprised of multiple pairs of solenoids, and
each pair of solenoids controls a pressure valve and a hydraulic motor of an arm of the plurality of arms extending from the base.

8. The construction system of claim 6, wherein each hydraulic motor on each of the arms has one or more ports, each port connected to a solenoid of the valve manifold.

9. The construction system of claim 6, wherein each of the variable solenoids is associated with a pressure sensor that provides control feedback to the hydraulic actuator.

10. The construction system of claim 1, wherein the end effector platform is configured to attach to an additive construction nozzle, clamps, pincers, vacuum tool(s), grippers, nail gun, screw gun, torque gun, welder, rebar tying mechanism, brick laying mechanism, or a combination thereof.

11. A construction system, comprising
an excavator having a hydraulically controlled linkage; and
a hydraulic robot comprising:
a plurality of arms extending from a base, each arm having a hydraulic motor, each hydraulic motor being connected to a single valve manifold;
a robot control system directing movement of the plurality of arms; and
an end effector platform movable by rotation of the arms.

12. The construction system of claim 11, wherein each of the hydraulic motors includes an encoder configured to measure an angle of an arm relative to the base.

13. The construction system of claim 11, wherein the robot control system comprises a valve manifold with a plurality of variable solenoids and the valve manifold is positioned on the base.

14. The construction system of claim 11, wherein the robot control system comprises a valve manifold with a plurality of variable solenoids, the valve manifold is positioned on the base, and the plurality of variable solenoids are comprised of multiple pairs of solenoids, and each pair of solenoids controls a pressure valve and a hydraulic motor of an arm of the plurality of arms extending from the base.

15. The construction system of claim 11, wherein the robot control system comprises a valve manifold with a plurality of variable solenoids, the valve manifold is positioned on the base, and each hydraulic motor on each of the arms has one or more ports, each port connected to a solenoid of the valve manifold.

16. The construction system of claim 11, wherein the robot control system comprises a valve manifold with a plurality of variable solenoids, the valve manifold is positioned on the base, and each of the variable solenoids is associated with a pressure sensor that provides control feedback to the hydraulic actuator.

17. The construction system of claim 11, wherein the end effector platform is configured to attach to an additive construction nozzle, clamps, pincers, vacuum tool(s), grippers, nail gun, screw gun, torque gun, welder, rebar tying mechanism, brick laying mechanism, or a combination thereof, and each hydraulic motor is connected to a single valve manifold.

18. The construction system of claim 11, wherein each hydraulic motor is connected to a single valve manifold, each of the hydraulic motors includes an encoder configured to provide position feedback, and the end effector platform is configured to attach to an additive construction nozzle, clamps, pincers, vacuum tool(s), grippers, nail gun, screw gun, torque gun, welder, rebar tying mechanism, brick laying mechanism, or a combination thereof.

19. The construction system of claim 11 wherein the end effector platform is configured to attach to an additive construction nozzle, clamps, pincers, vacuum tool(s), grippers, nail gun, screw gun, torque gun, welder, rebar tying mechanism, brick laying mechanism, or a combination thereof.

20. A construction system, comprising
an excavator having a hydraulically controlled linkage; and
a hydraulic robot comprising:
a plurality of arms extending from a base, each arm having a hydraulic motor including a linear-rotary actuator;
a robot control system directing movement of the plurality of arms; and
an end effector platform movable by rotation of the arms, wherein
the robot control system comprises a valve manifold with a plurality of variable solenoids and
the valve manifold is positioned on the base.

* * * * *